Nov. 24, 1936.  F. E. STAHL  2,061,718
ADJUSTABLE CLAMP
Filed Dec. 21, 1934  2 Sheets-Sheet 1

Inventor,
FRANK E. STAHL

Nov. 24, 1936.   F. E. STAHL   2,061,718
ADJUSTABLE CLAMP
Filed Dec. 21, 1934   2 Sheets-Sheet 2

Inventor,
FRANK E. STAHL
by
J. Wm Ellis
Attorney.

Patented Nov. 24, 1936

2,061,718

UNITED STATES PATENT OFFICE 2,061,718

ADJUSTABLE CLAMP

Frank E. Stahl, Tonawanda, N. Y., assignor to Columbus McKinnon Chain Corporation, Tonawanda, N. Y., a corporation of New York Application December 21, 1934, Serial No. 758,677

2 Claims. (Cl. 90—59)

My invention relates in general to adjustable clamps, and in particular to a clamp used upon jigs or work piece holders for use in connection with machine tools or the like.

The principal object of my invention has been to provide a clamp by which the work pieces may be quickly inserted in and withdrawn from a tool jig. This feature is especially valuable in connection with factory work which is to be done on a production basis.

Another object has been to provide a clamp for such a jig which may be operated to its clamping or unclamping position by a very small movement.

Moreover, my device is of few parts and may be easily and quickly adjusted so as to bring the operating handle of the clamp in the most convenient position for operation.

Furthermore, my clamp is of such a nature that it will securely hold the work piece in place.

The above objects and advantages have been accomplished by the device shown in the accompanying drawings, of which:

Figure 1:
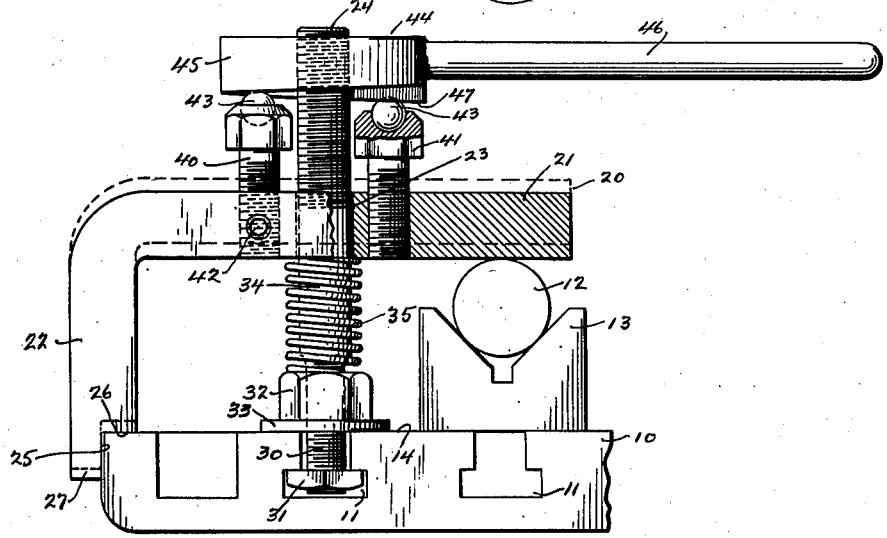
Fig. 1 is a front elevation of my device, partly in section.

While my invention is applicable to jigs of various sorts, and while it may be used upon any machine tool which is to be used in operating upon a work piece, I have, for convenience of illustration, shown my device as applied to the bed of a milling machine and designed to hold a shaft or other round work piece, it being obvious that slight changes would be made in the structure of the jig in adapting it to various other uses to which it may be put.

In the drawings, 10 represents the bed of the milling machine which is provided with the usual T-shaped slots 11. As hereinbefore indicated, the device illustrated is designed for milling or otherwise working upon a shaft 12 which, as is well understood, is best held in place by means of a V-block 13, which is rested upon the top surface 14 of the milling machine and secured in place, if desired, by any well known means.

My device is provided with a jig member 20 which is preferably angular in shape, having a horizontal arm 21 and a vertical arm 22. The horizontal arm 21 is provided with an aperture 23 for passage over a clamping bolt 24. The vertical arm 22 is provided preferably with a notch 25 which forms a shoulder 26. The distance from the shoulder 26 to the under side of the horizontal arm 21 of the jig member is preferably the same as the distance from the top of the work piece to the top surface 14 of the table. The downwardly extending lug 27 thus formed on the vertical arm 22 of the jig member acts as a stop or detent for the jig member.

Figure 5:
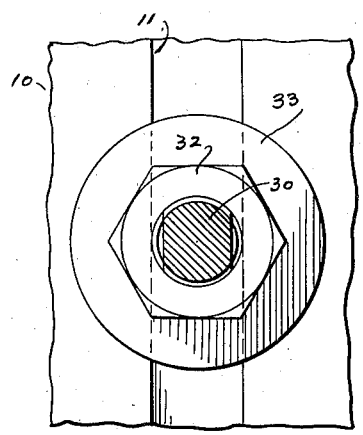
Fig. 5 is a sectional view taken on line 5—5 of Fig. 1.

The clamping bolt 24 is carried by one of the T-shaped slots 11 of the milling machine and is provided with a flattened lower end 30 for passage between the narrow part of the T-shaped slot, as clearly shown in Fig. 5. The lower end of the bolt is screwthreaded, and a nut 31 is carried at the extreme lower end of the portion 30 and serves to engage the under surfaces of the wider part of the T-shaped slot. A nut 32 and washer 33 are also placed upon the lower end of the bolt, and these serve to firmly secure the bolt within the T-shaped slot, allowing its body part 34 to extend upwardly through the aperture 23 of the jig member. A helical spring 35 is mounted upon the bolt under the jig member, whereby the horizontal arm 21 of such member will be moved upwardly when released, thus making it convenient to withdraw the finished work piece from the jig and to insert a new one.

Carried by the horizontal arm 21 of the jig member are two adjusting screws 40 and 41 which are screwthreaded into the arm and are set in adjusted positions by means of set screws 42. At the upper end of each of these screws 40 and 41 is a rotatably mounted, anti-friction ball 43. Disposed on the extreme upper end of the body 34 of the clamping bolt 24 is the clamping member 44 of my device. This clamping member is screwthreaded to the upper end of the clamping bolt 24 and comprises a clamping head 45 and an operating arm 46 extending therefrom in a horizontal plane.

Figure 3:
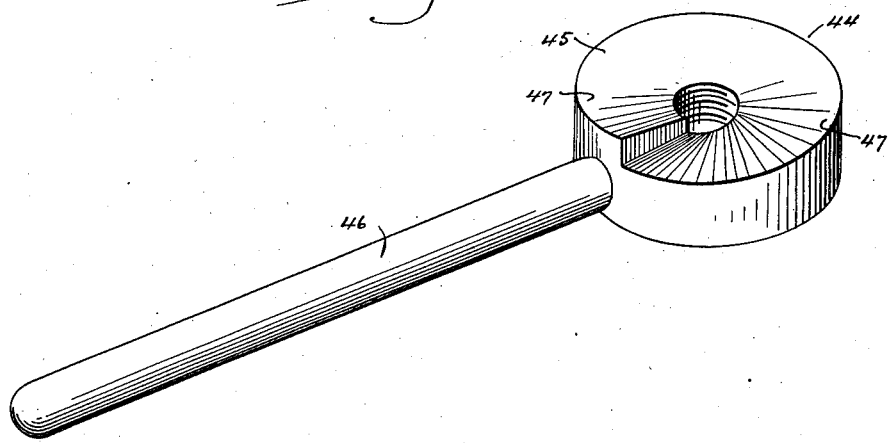
Fig. 3 is an enlarged, perspective view of the clamping member of the device.
Figure 4:
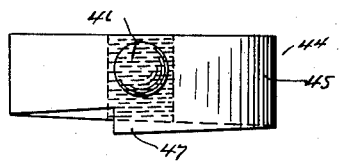
Fig. 4 is an end view thereof.

The clamping member is provided on its under surface with a helically shaped cam 47, as clearly shown in Figs. 1, 3, and 4. This cam, as shown in the drawings, comprises a helix of suitable pitch extending through substantially 360°. Obviously, however, two oppositely arranged cams, each extending only through 180°, may be used if desired. The screws 40 and 41 are so adjusted that the anti-friction balls 43 carried thereby will engage with the cam face 47 of the clamping member. Since the adjusting screws 40 and 41 are arranged diametrically opposite each other, the cam 47 of the clamping member will produce a uniformly distributed pressure upon the horizontal arm 21 of the jig member.

Figure 2:
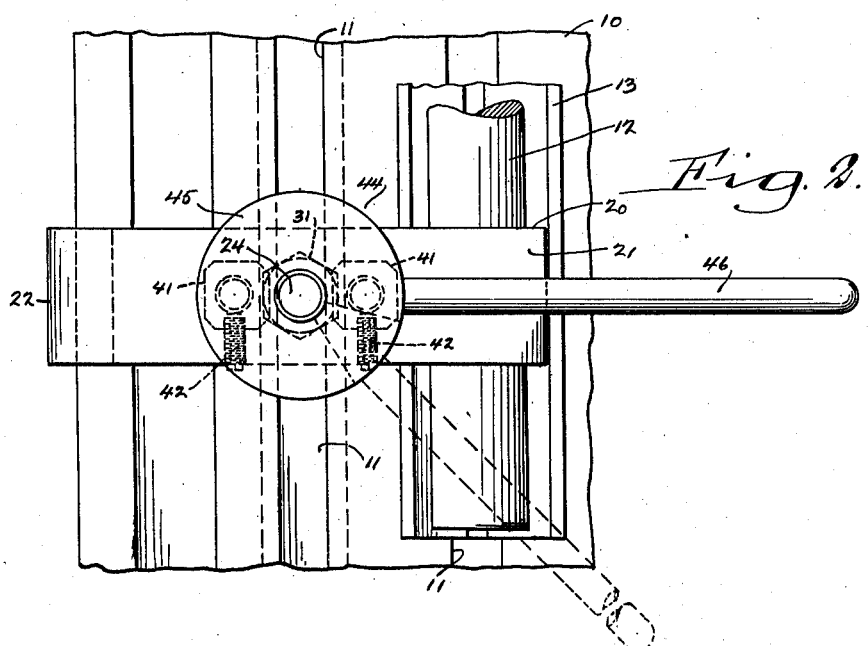
Fig. 2 is a plan view thereof.

When my device is to be set up for work upon shafts like those indicated at 12 in Figs. 1 and 2, the horizontal arm 21 of the jig member is brought to bear upon the work piece, and the handle 46 of the clamping member is moved to the position where it may be most conveniently operated by the workman. The adjusting screws 40 and 41 are now so rotated that the anti-friction balls 43 carried thereby are brought into engagement with the cam-shaped surface 47 of the head 45 of the clamping member with substantially equal pressure. When so adjusted, the set screws 42 are drawn up so as to hold the screws 40 and 41 in their adjusted positions. Obviously, when the adjusting screws are once set, they do not have to be altered for successive work pieces since, in the case of the shaft shown for illustrative purposes, the dimensions are always uniform. After once having been set, the work piece may be securely clamped in position by rotating the operating arm 46 of the clamping member in such direction as to cause the cam 47 to push the adjusting screws and the horizontal arm 21 of the jig downwardly in contact with the work piece 12. When the handle is operated in the opposite direction, the work piece will be released and the spring 35 will cause the jig member 20 and screws 40 and 41 to move upwardly, remaining in contact with the cam 47 of the clamping member, whereby the work piece may be conveniently removed and a new work piece inserted. Such positions are shown by the dotted lines in Figs. 1 and 2.

Obviously, instead of fastening the clamping head 45 onto the bolt by means of screw threads, this head may be rotatably held in place on the bolt by means of a collar (not shown).

Obviously, this and other modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. An adjustable clamp for jigs adapted to cooperate with the bed of a machine tool, comprising a bolt, means for rigidly securing the bolt to the bed, a jig member slidably carried by the bolt and having cooperative relation with the bed and a work-piece, a clamping member having an operating handle rotatably carried upon the bolt and in interspaced relation with the jig member, said clamping member being provided with a helically formed working face on its lower surface, diametrically arranged adjusting screws carried by the jig member and having cooperative engagement with the helical face of the clamping member, and means for setting such screws in their adjusted positions.

2. An adjustable clamp for jigs adapted to cooperate with the bed of a machine tool, comprising a bolt, means for rigidly securing the bolt to the bed, a jig member slidably carried by the bolt and having cooperative relation with the bed and a work-piece, a clamping member having an operating handle rotatably carried upon the bolt and in interspaced relation with the jig member, said clamping member being provided with a helically formed working face on its lower surface, diametrically arranged adjusting screws carried by the jig member and having cooperative engagement with the helical face of the clamping member, means for setting such screws in their adjusted positions, and anti-friction means carried by the adjusting screws and engageable with the working face of the clamping member.

FRANK E. STAHL.